US007100261B2

(12) United States Patent
Gulati

(10) Patent No.: US 7,100,261 B2
(45) Date of Patent: Sep. 5, 2006

(54) LIQUEFIED NATURAL GAS STORAGE TANK

(75) Inventor: Kailash C. Gulati, Houston, TX (US)

(73) Assignee: Exxon Mobil Upstream Research Company, Houston, TX (US)

( * ) Notice: Subject to any disclaimer, the term of this patent is extended or adjusted under 35 U.S.C. 154(b) by 0 days.

(21) Appl. No.: 11/246,928

(22) Filed: Oct. 7, 2005

(65) Prior Publication Data

US 2006/0026836 A1 Feb. 9, 2006

Related U.S. Application Data

(60) Division of application No. 10/796,268, filed on Mar. 9, 2004, now Pat. No. 6,981,305, which is a division of application No. 09/876,684, filed on Jun. 7, 2001, now Pat. No. 6,729,492, which is a continuation-in-part of application No. 09/256,383, filed on Feb. 24, 1999, now Pat. No. 6,732,881.

(60) Provisional application No. 60/104,325, filed on Oct. 15, 1998.

(51) Int. Cl.
*B23P 21/00* (2006.01)
*F17C 1/00* (2006.01)
*B65D 88/00* (2006.01)
*B65D 90/00* (2006.01)

(52) U.S. Cl. ....................... 29/463; 29/462; 29/897.31; 29/469; 220/560.04; 220/651; 220/567.2

(58) Field of Classification Search .................. 29/462, 29/463, 469, 897.31, 897.312, 897, 801, 29/428, 454, 773; 220/560.04, 560.07, 560.08, 220/564, 651, 653, 654, 4.12, 567.2; 52/651.1, 52/651.3, 480, 474, 483.1, 650.3; 244/119, 244/120, 125, 126
See application file for complete search history.

(56) References Cited

U.S. PATENT DOCUMENTS 1,300,777 A * 4/1919 Reid .......................... 244/119
1,408,829 A * 3/1922 Rial ........................ 220/567.2
1,477,686 A 12/1923 Braender
1,631,051 A 5/1927 Nichols
1,809,013 A 6/1931 Boardman
1,864,759 A 6/1932 Pritchard
1,933,860 A 11/1933 Kjekstad
2,082,836 A 6/1937 Kjekstad
2,083,051 A 6/1937 Chapas
2,115,165 A 4/1938 Hathorn
2,119,518 A 6/1938 Boardman
2,156,400 A 5/1939 Pechstein
2,296,414 A 9/1942 Albrecht
2,331,483 A 10/1943 Lawman et al.
2,333,792 A 11/1943 Jackson
2,337,049 A 12/1943 Jackson (Continued)

FOREIGN PATENT DOCUMENTS

DE 41 21 762 C 1 9/1992

(Continued)

*Primary Examiner*—David P. Bryant
*Assistant Examiner*—Christopher M. Koehler

(57) ABSTRACT

Substantially rectangular-shaped tanks are provided for storing liquefied gas, which tanks are especially adapted for use on land or in combination with bottom-supported offshore structure such as gravity-based structures (GBS). A tank according to this invention is capable of storing fluids at substantially atmospheric pressure and has a plate cover adapted to contain fluids and to transfer local loads caused by contact of said plate cover with said contained fluids to a grillage of stiffeners and stringers, which in turn is adapted to transfer the local loads to an internal truss frame structure. Methods of constructing these tanks are also provided.

6 Claims, 9 Drawing Sheets

U.S. PATENT DOCUMENTS 2,341,547 A 2/1944 Heineman
2,352,296 A 6/1944 Szego
2,380,089 A 7/1945 Ulm
2,382,357 A * 8/1945 Watter .......................... 52/222
2,386,019 A 10/1945 Watter
2,412,578 A 12/1946 Harris
2,533,041 A 12/1950 Plummer
2,593,153 A * 4/1952 Joor, Jr. ...................... 220/565
2,673,001 A 3/1954 Ulm et al.
2,911,125 A 11/1959 Dosker
2,975,927 A 3/1961 Arne
2,982,441 A 5/1961 Farrell et al.
3,062,402 A 11/1962 Farrell et al.
3,096,901 A * 7/1963 Arne .......................... 220/565
3,172,560 A 3/1965 Bergmann
3,441,164 A 4/1969 Wang
3,447,503 A * 6/1969 Myers ...................... 114/77 R
3,472,414 A 10/1969 Rodrigues
3,583,592 A 6/1971 Kerfman
3,602,391 A 8/1971 Tramontini
3,731,450 A 5/1973 de Chateau
3,780,687 A 12/1973 McDonald, Jr.
3,799,383 A 3/1974 Gerhard
3,931,908 A 1/1976 Cheyney
3,978,808 A 9/1976 Cuneo et al.
3,979,005 A 9/1976 Robinson et al.
4,207,827 A 6/1980 Gondouin
4,374,478 A 2/1983 Secord
5,143,283 A 9/1992 Lancaster
5,193,714 A 3/1993 Carey
5,263,604 A 11/1993 Metz .......................... 220/445
5,375,547 A 12/1994 Abe et al.
5,505,035 A 4/1996 Lalvani
5,531,178 A 7/1996 Abe et al.
5,586,391 A * 12/1996 Micale ...................... 29/897.2
5,651,474 A 7/1997 Callaghan et al.
6,073,420 A 6/2000 Bjoru et al.
6,076,324 A 6/2000 Daily et al.
6,729,492 B1 5/2004 Gulati
6,732,881 B1 5/2004 Gulati

FOREIGN PATENT DOCUMENTS

DE 195 24 680 A 1 1/1997
WO WO 00/21847 4/2000
WO WO 02/081297 A2 10/2002

* cited by examiner

LIQUEFIED NATURAL GAS STORAGE TANK

CROSS REFERENCE TO RELATED APPLICATION

This application is a divisional of U.S. application Ser. No. 10/796,268, filed 9 Mar. 2004 now U.S. Pat. No. 6,981,305, which is a divisional of U.S. application Ser. No. 09/876,684, filed 7 Jun. 2001 now U.S. Pat. No. 6,729,492, which is a continuation-in-part of U.S. application Ser. No. 09/256,383, filed 24 Feb. 1999 now U.S. Pat. No. 6,732,881, which claims the benefit of U.S. Provisional Application No. 60/104,325, filed 15 Oct. 1998.

FIELD OF THE INVENTION

The present invention relates to liquefied gas storage tanks and in one aspect relates to tanks especially adapted for storing liquefied gases at cryogenic temperatures at near atmospheric pressures (e.g., liquefied natural gas ("LNG")).

BACKGROUND OF THE INVENTION

Various terms are defined in the following specification. For convenience, a Glossary of terms is provided herein, immediately preceding the claims.

Liquefied natural gas (LNG) is typically stored at cryogenic temperatures of about −162° C. (−260° F.) and at substantially atmospheric pressure. As used herein, the term "cryogenic temperature" includes any temperature of about −40° C. (−40° F.) and lower. Typically, LNG is stored in double walled tanks or containers. The inner tank provides the primary containment for LNG while the outer tank holds insulation in place and protects the inner tank and the insulation from adverse effects of the environment. Sometimes, the outer tank is also designed to provide a secondary containment of LNG in case the inner tank fails. Typical sizes of tanks at LNG import or export terminals range from about 80,000 to about 160,000 meters$^3$ (0.5 to 1.0 million barrels) although tanks as large as 200,000 meters$^3$ (1.2 million barrels) have been built or are under construction.

For large volume storage of LNG, two distinct types of tank construction are widely used. The first of these is a flat-bottomed, cylindrical, self-standing tank that typically uses a 9% nickel steel for the inner tank and carbon steel, 9% nickel steel, or reinforced/prestressed concrete for the outer tank. The second type is a membrane tank wherein a thin (e.g. 1.2 mm thick) metallic membrane is installed within a cylindrical concrete structure which, in turn, is built either below or above grade on land. A layer of insulation is typically interposed between the metallic membrane, e.g., of stainless steel or of a product with the tradename Invar, and the load bearing concrete cylindrical walls and flat floor.

While structurally efficient, circular cylindrical tanks in their state-of-practice designs are difficult and time consuming to build. Self-standing 9% nickel steel tanks, in their popular design where the outer secondary container is capable of holding both the liquid and the gas vapor, albeit at near atmospheric pressure, take as long as thirty six months to build. Typically, membrane tanks take just as long or longer to build. On many projects, this causes undesirable escalation of construction costs and length of construction schedule.

Recently, radical changes have been proposed in the construction of LNG terminals, especially import terminals. One such proposal involves the building of the terminal a short distance offshore where LNG will be off-loaded from a transport vessel, and stored for retrieval and regasification for sale or use as needed. One such proposed terminal has LNG storage tanks and regasification equipment installed on what is popularly known as a Gravity Base Structure (GBS), a substantially rectangular-shaped, barge-like structure similar to certain concrete structures now installed on the seafloor and being used as platforms for producing petroleum in the Gulf of Mexico.

Unfortunately, neither cylindrical tanks nor membrane tanks are considered as being particularly attractive for use in storing LNG on GBS terminals. Cylindrical tanks typically do not store enough LNG to economically justify the amount of room such tanks occupy on a GBS and are difficult and expensive to construct on a GBS. Further the size of such tanks must typically be limited (e.g. to no larger than about 50,000 meters$^3$ (approximately 300,000 barrels)) so that the GBS structures can be fabricated economically with readily available fabrication facilities. This necessitates a multiplicity of storage units to satisfy particular storage requirements, which is typically not desirable from cost and other operational considerations.

A membrane-type tank system can be built inside a GBS to provide a relatively large storage volume. However, a membrane-type tank requires a sequential construction schedule wherein the outer concrete structure has to be completely built before the insulation and the membrane can be installed within a cavity within the outer structure. This normally requires a long construction period, which tends to add substantially to project costs.

Accordingly, a tank system is needed for both onshore conventional terminals and for offshore storage of LNG, which tank system alleviates the above-discussed disadvantages of self-standing cylindrical tanks and membrane-type tanks.

In published designs of rectangular tanks (see, e.g., Farrell et. al., U.S. Pat. Nos. 2,982,441 and 3,062,402, and Abe, et al., U.S. Pat. No. 5,375,547), the plates constituting the tank walls that contain the fluids are also the major source of strength and stability of the tank against all applied loads including static and, when used on land in a conventional LNG import or export terminal or a GBS terminal, earthquake induced dynamic loads. For such tanks, large plate thickness may be required even when the contained liquid volume is relatively small, e.g., 5,000 meters$^3$ (30,000 barrels). For example, Farrell et al. U.S. Pat. No. 2,982,441 provides an example of a much smaller tank, i.e., 45,000 ft$^3$ (1275 meters$^3$), which has a wall thickness of about ½ inch (see column 5, lines 41–45). Tie rods may be provided to connect opposite walls of the tank for the purpose of reducing wall deflections and/or tie rods may be used to reinforce the corners at adjacent walls. Alternatively, bulkheads and diaphragms may be provided in the tank interior to provide additional strength. When tie rods and/or bulkheads are used, such tanks up to moderate sizes, e.g., 10,000 to 20,000 meters$^3$ (60,000 to 120,000 barrels), may be useful in certain applications. For traditional use of rectangular tanks, the size limitation of these tanks is not a particularly severe restriction. For example, both Farrell, et al., and Abe, et al., tanks were invented for use in transport of liquefied gases by sea going vessels. Ships and other floating vessels used in transporting liquefied gases typically are limited to holding tanks of sizes up to about 20,000 meters$^3$.

Large tanks in the range of 100,000 to 200,000 meters$^3$ (approximately 600,000 to 1.2 million barrels), built in accordance with the teachings of Farrell et al. and Abe, et al. would require massive interior bulkheads and diaphragms and would be very costly to build. Typically, any tank of the type taught by Farrell et al., and Abe, et al., i.e., in which the tank strength and stability is provided by the liquid containing tank exterior walls or a combination of the tank interior diaphragms and liquid containing tank exterior walls, is going to be quite expensive, and most often too expensive to be deemed economically attractive. There are many sources of gas and other fluids in the world that might be economically developed and delivered to consumers if an economical storage tank were made available.

Bulkheads and diaphragms in the interior of a tank built in accordance with the teachings of Farrell, et al. and Abe, et al., would also subdivide the tank interior into multiple small cells. When used on ships or similar floating bodies, small liquid storage cells are of advantage because they do not permit development of large magnitudes of dynamic forces due to ocean wave induced dynamic motion of the ship. Dynamic motions and forces due to earthquakes in tanks built on land or on sea bottom are, however, different in nature and large tank structures that are not subdivided into a multitude of cells typically fare better when subjected to such motions and forces.

Accordingly, there is a need for a storage tank for LNG and other fluids that satisfies the primary functions of storing fluids and of providing strength and stability against loads caused by the fluids and by the environment, including earthquakes, while built of relatively thin metal plates and in a relatively short construction schedule. Such a tank will preferably be capable of storing 100,000 meters$^3$ (approximately 600,000 barrels) and larger volumes of fluids and will be much more fabrication friendly than current tank designs.

SUMMARY OF THE INVENTION

The present invention provides substantially rectangular-shaped tanks for storing fluids, such as liquefied gas, which tanks are especially adapted for use on land or in combination with bottom-supported offshore structures such as gravity based structures (GBS). Also methods of constructing such tanks are provided. A fluid storage tank according to this invention comprises (I) an internal, substantially rectangular-shaped truss frame structure, said internal truss frame structure comprising: (i) a first plurality of truss structures positioned transversely and longitudinally-spaced from each other in a first plurality of parallel vertical planes along the length direction of said internal truss frame structure; and (ii) a second plurality of truss structures positioned longitudinally and transversely-spaced from each other in a second plurality of parallel vertical planes along the width direction of said internal truss frame structure; said first plurality of truss structures and said second plurality of truss structures interconnected at their points of intersection and each of said first and second plurality of truss structures comprising: (a) a plurality of both vertical, elongated supports and horizontal, elongated supports, connected at their respective ends to form a gridwork of structural members, and (b) a plurality of additional support members secured within and between said connected vertical and horizontal, elongated supports to thereby form each said truss structure; (II) a grillage of stiffeners and stringers arranged in a substantially orthogonal pattern, interconnected and attached to the external extremities of the internal truss frame structure such that when attached to vertical sides of the truss periphery, the stiffeners and stringers are in substantially the vertical and horizontal directions respectively, or in substantially the horizontal and vertical directions respectively, and (III) a plate cover attached to the periphery of said grillage of stiffeners and stringers; all such that said tank is capable of storing fluids at substantially atmospheric pressure and said plate cover is adapted to contain said fluids and to transfer local loads induced on said plate cover by contact with said contained fluids to said grillage of stiffeners and stringers, which in turn is adapted to transfer said local loads to the internal truss frame structure. As used herein, a plate or plate cover is meant to include (i) one substantially smooth and substantially flat body of substantially uniform thickness or (ii) two or more substantially smooth and substantially flat bodies joined together by any suitable joining method, such as by welding, each said substantially smooth and substantially flat body being of substantially uniform thickness. The plate cover, the grillage of stiffeners and stringers, and the internal truss frame structure can be constructed from any suitable material that is suitably ductile and has acceptable fracture characteristics at cryogenic temperatures (e.g., a metallic plate such as 9% nickel steel, aluminum, aluminum alloys, etc.), as may be determined by one skilled in the art.

A tank according to this invention is a substantially rectangular-shaped structure that can be erected on land and/or fitted into a space within a steel or concrete GBS and that is capable of storing large volumes (e.g. 100,000 meters$^3$ and larger) of LNG at cryogenic temperatures and near atmospheric pressures. Because of the open nature of trusswork in the tank interior, such a tank containing LNG is expected to perform in a superior manner in areas where seismic activity (e.g. earthquakes) is encountered and where such activity may induce liquid sloshing and associated dynamic loads within the tank.

Advantages of the structural arrangement of the present invention are clear. The plate cover is designed for fluid containment and for bearing local pressure loads, e.g., caused by the fluid. The plate cover transmits the local pressure loads to the structural grillage of stringers and stiffeners, which in turn transfers the loads to the internal truss frame structure. The internal truss frame structure ultimately bears all the loads and disposes them off to the tank foundation; and the internal truss frame structure can be designed to be sufficiently strong to meet any such load-bearing requirements. Preferably, the plate cover is designed only for fluid containment and for bearing local pressure loads. Separation of the two functions of a tank structure, i.e., the function of liquid containment fulfilled by the plate cover, and the overall tank stability and strength provided by the internal truss structure and the structural grillage of stringers and stiffeners permits use of thin metallic plates, e.g., up to 13 mm (0.52 in) for the plate cover. Although thicker plates may also be used, the ability to use thin plates is an advantage of this invention. This invention is especially advantageous when a large, e.g., about 160,000 meter$^3$ (1.0 million barrel) substantially rectangular-shaped tank is built in accordance with this invention using one or more metallic plates that are about 6 to 13 mm (0.24 to 0.52 in) thick to construct the plate cover. In some applications, the plate cover is preferably about 10 mm (0.38 inches) thick.

Many different arrangements of beams, columns and braces can be devised to achieve the desired strength and stiffness of a truss frame structure as illustrated by the use of trusses on bridges and other civil structures. For a tank of the present invention, the truss frame structure construction in the longitudinal (length) and transverse (width) directions may be different. The trusses in the two different directions are designed to provide, at a minimum, the strength and stiffness required for the expected overall dynamic behavior when subjected to a specified seismic activity and other specified load bearing requirements. For example, there is generally a need to support the tank roof structure against internal vapor pressure loads and to support the entire tank structure against loads due to the unavoidable unevenness of the tank floor.

By using an internal truss frame structure to provide the primary support for the tank, the interior of the tank may be effectively contiguous throughout without any encumbrances provided by any bulkheads or the like. This permits the relatively long interior of the tank of this invention to avoid resonance conditions during sloshing under the substantially different dynamic loading caused by seismic activity as opposed to the loading that occurs due to the motion of a sea-going vessel.

In contrast to published designs of rectangular liquid storage tanks, which teach away from reinforcement and stiffening of tank walls in the vertical direction, the structural arrangement of the present invention permits use of structural elements such as stiffeners and stringers in both the horizontal and vertical directions to achieve good structural performance. Similarly, while published designs require installation of bulkheads and diaphragms to achieve required tank strength with such bulkheads and diaphragms causing large liquid sloshing waves during an earthquake and thus inducing large forces on the diaphragm structure and the tank walls, the open frame of the trusses in tanks according to this invention minimize dynamic loads due to liquid sloshing in earthquake prone sites.

DESCRIPTION OF THE DRAWINGS

The advantages of the present invention will be better understood by referring to the following detailed description and the attached drawings in which.

While the invention will be described in connection with its preferred embodiments, it will be understood that the invention is not limited thereto. On the contrary, the invention is intended to cover all alternatives, modifications, and equivalents which may be included within the spirit and scope of the present disclosure, as defined by the appended claims.

DETAILED DESCRIPTION OF THE INVENTION

A substantially rectangular-shaped storage tank of a preferred embodiment of the present invention is designed to provide the ability to vary capacity of the tank, in discrete steps, without a substantial redesign of the tank. Solely for construction purposes, this is achieved by considering the tank as comprising a number of similar structural modules. For example, a 100,000 meter$^3$ tank may be considered to comprise four substantially equal structural modules obtained by cutting a large tank by three imaginary vertical planes suitably spaced along the length direction such that each section is conceptually able to hold approximately 25,000 meter$^3$ of liquid. Such a tank is comprised of two substantially identical end sections and two substantially identical mid sections. By removing or adding mid sections during construction of the tank, tanks of same cross-section, i.e., same height and width, but variable length and thus variable capacity, in discrete steps, can be obtained. A tank that has two end sections, but no mid sections, may also be constructed according to this invention. The two end sections are structurally similar, preferably identical, and comprise one or more vertical transverse trusses and parts of vertical longitudinal trusses that when connected to similar parts of the longitudinal trusses on adjoining mid sections (or end section) during the construction process will provide continuous vertical longitudinal trusses and a monolithic tank structure. All of the mid sections, if any, have similar, preferably basically the same, construction and each is comprised of one or more transverse trusses and parts of the longitudinal trusses in a similar manner as for the end sections. For both the end sections and mid sections, structural grillage (comprising stringers and stiffeners) and plates are attached at those truss extremities that will eventually form the outer surface, including the plate cover, of the completed tank, and preferably only at such truss extremities.

Figure 1A:
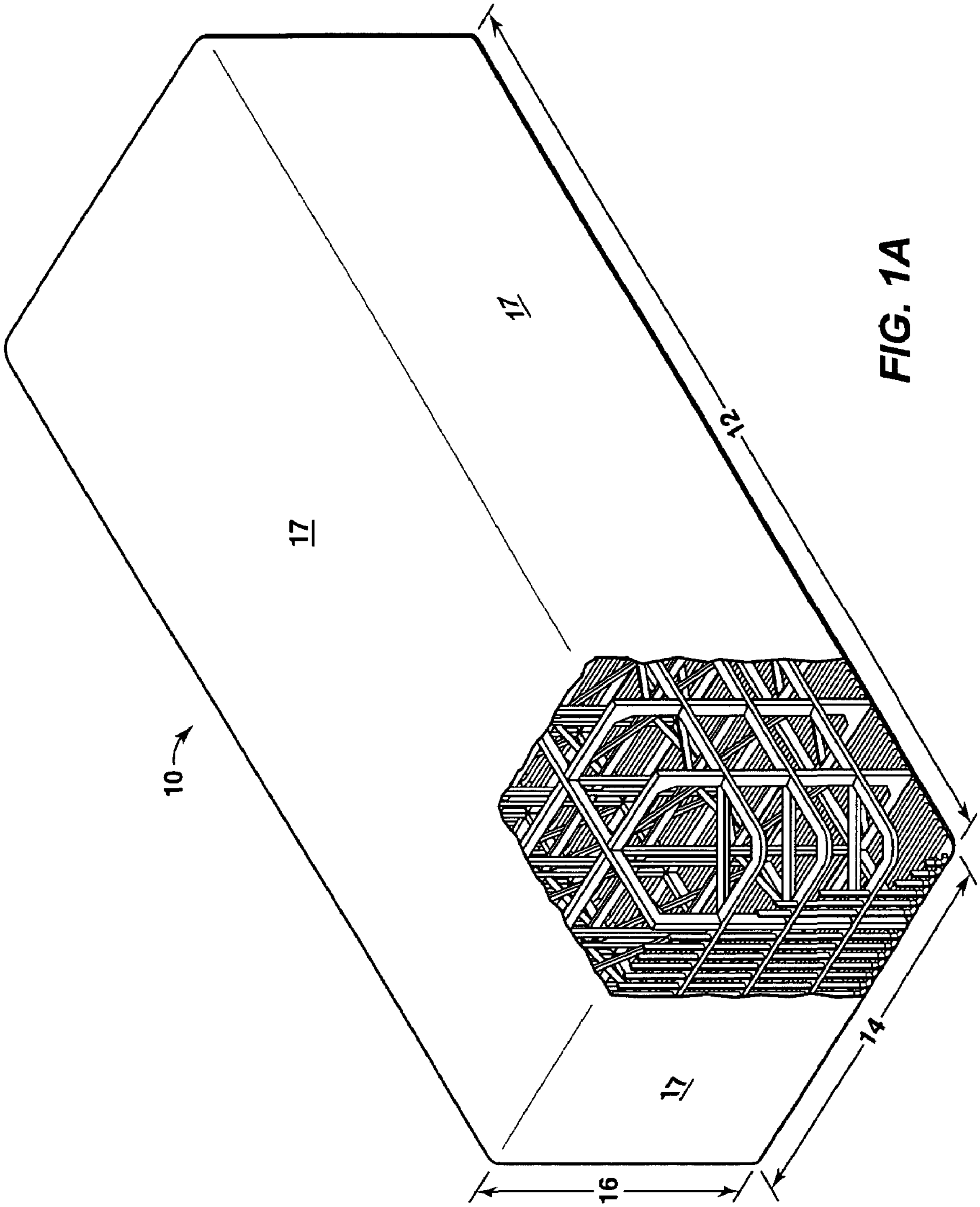
FIG. 1A is a sketch of a tank according to this invention.

FIGS. 1A–1D depict the basic structure of a storage tank according to this invention. Referring to FIG. 1A, substantially rectangular-shaped tank 10 is 100 meters (328 feet) in length 12 by 40 meters (131 feet) in width 14 by 25 meters (82 feet) in height 16. Basically, tank 10 is comprised of an internal, truss frame structure 18, a grillage of stiffeners 27 and stringers 28 (shown in FIGS. 1C and 1D) attached to truss frame structure 18, and a thin plate cover 17 attached to the grillage of stiffeners 27 and stringers 28. The thin plate cover 17, the grillage of stiffeners 27 and stringers 28, and the internal truss frame structure 18 can be constructed from any suitable material that is ductile and has acceptable fracture characteristics at cryogenic temperatures (e.g., a metallic plate such as 9% nickel steel, aluminum, aluminum alloys, etc.). In a preferred embodiment, thin plate cover 17 is constructed from steel having a thickness of about 10 mm (0.38 inches), more preferably from about 6 mm (0.25 inches) to about 10 mm (0.38 inches). The thin plate cover 17 when assembled (i) provides a physical barrier adapted to contain a fluid, such as LNG, within tank 10 and (ii) bears local loads and pressures caused by contact with the contained fluids, and transmits such local loads and pressures to the structural grillage comprised of stiffeners 27 and stringers 28 (See FIGS. 1C and 1D), which, in turn, transmit these loads to the truss frame structure 18. Truss frame structure

18 ultimately bears the aggregate of local loads, including seismically induced liquid sloshing loads caused by earthquakes, transmitted by thin plate cover 17 and the structural grillage from the periphery of tank 10 and disposes these loads to the foundation of tank 10.

Figure 1B:
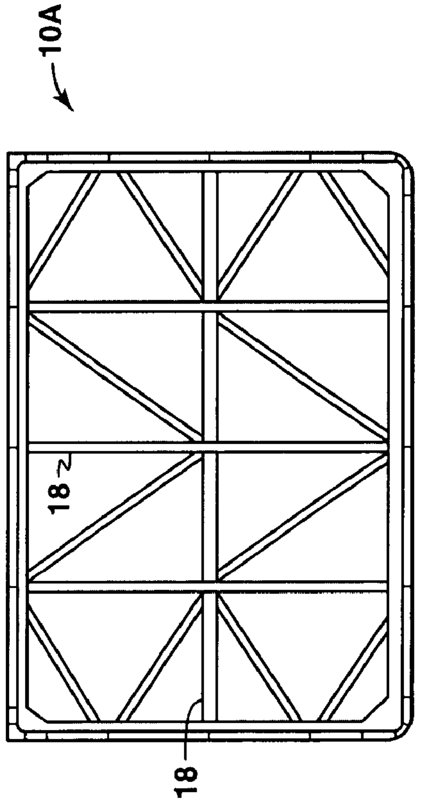
FIG. 1B is a cut-away sectional view of a mid section of a tank according to this invention.
Figure 1C:
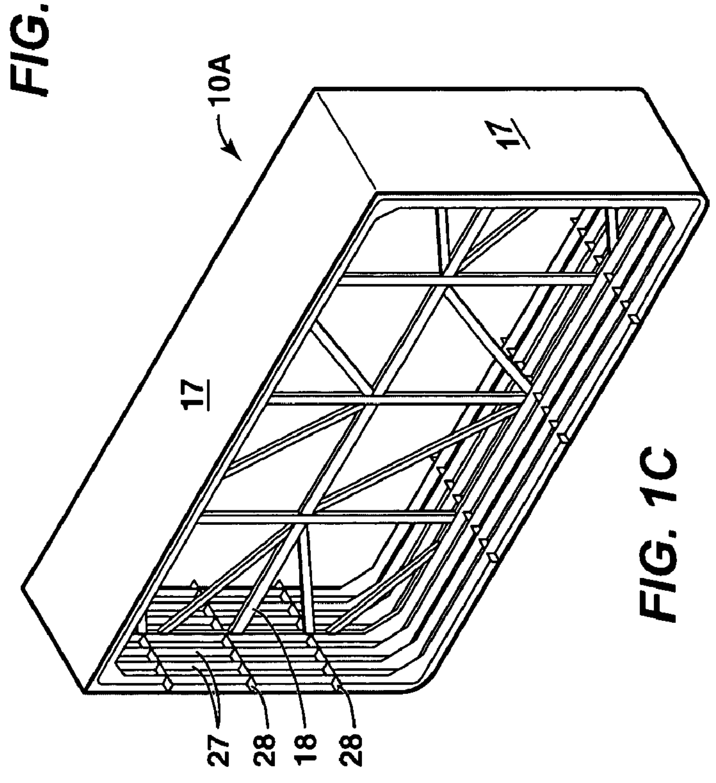
FIG. 1C is another view of the section shown in FIG. 1B.
Figure 1D:
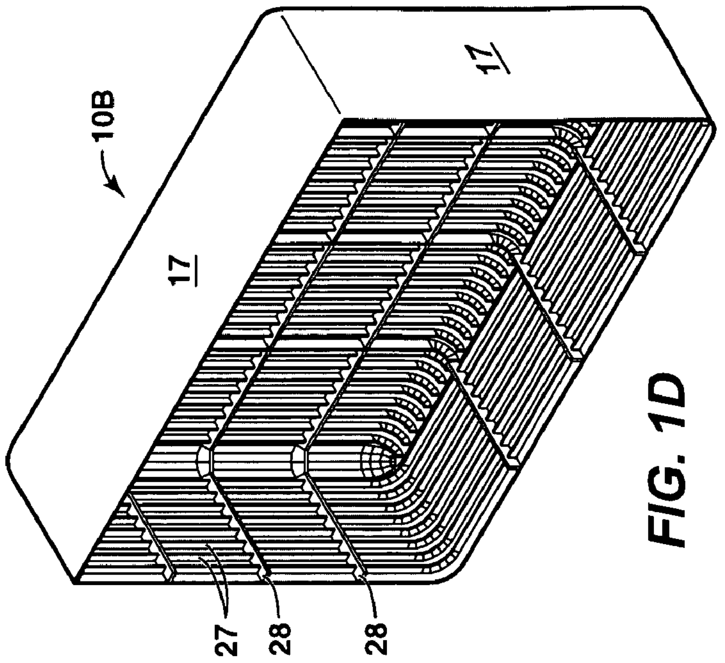
FIG. 1D is a cut-away sectional view of an end section of a tank according to this invention.

More specifically, storage tank 10 is a freestanding, substantially rectangular-shaped tank that is capable of storing large amounts (e.g. 100,000 meters$^3$ (approximately 600,000 barrels)) of liquefied natural gas (LNG). While different construction techniques may be used, FIGS. 1B–1D illustrate a preferred method of assembling a tank according to this invention, such as tank 10. For fabrication and construction purposes, tank 10 with contiguous interior space may be considered as sliced into a plurality of sections, e.g. ten sections, comprising two substantially identical end pieces 10B (FIG. 1D), and a plurality, e.g., eight, substantially identical mid sections 10A (FIGS. 1B and 1C). These sections 10A and 10B may be transported by marine vessels or barges to the site of construction and assembled into a monolithic tank unit. This method of construction provides a means of achieving a variable size of tank 10 to suit variable storage requirements without the need to redesign tank 10. This is achieved by keeping the design of end sections 10B and mid sections 10A substantially the same, but varying the number of mid sections 10A that are inserted between two end sections 10B. While technically feasible, this embodiment of the invention may present challenges in certain circumstances. For example, for large tanks constructed from thin steel plate, handling of the structural sections eventually comprising the tank during transportation and assembly of the sections into a monolithic tank, would require great care to avoid damaging any of the sections.

Figure 2:
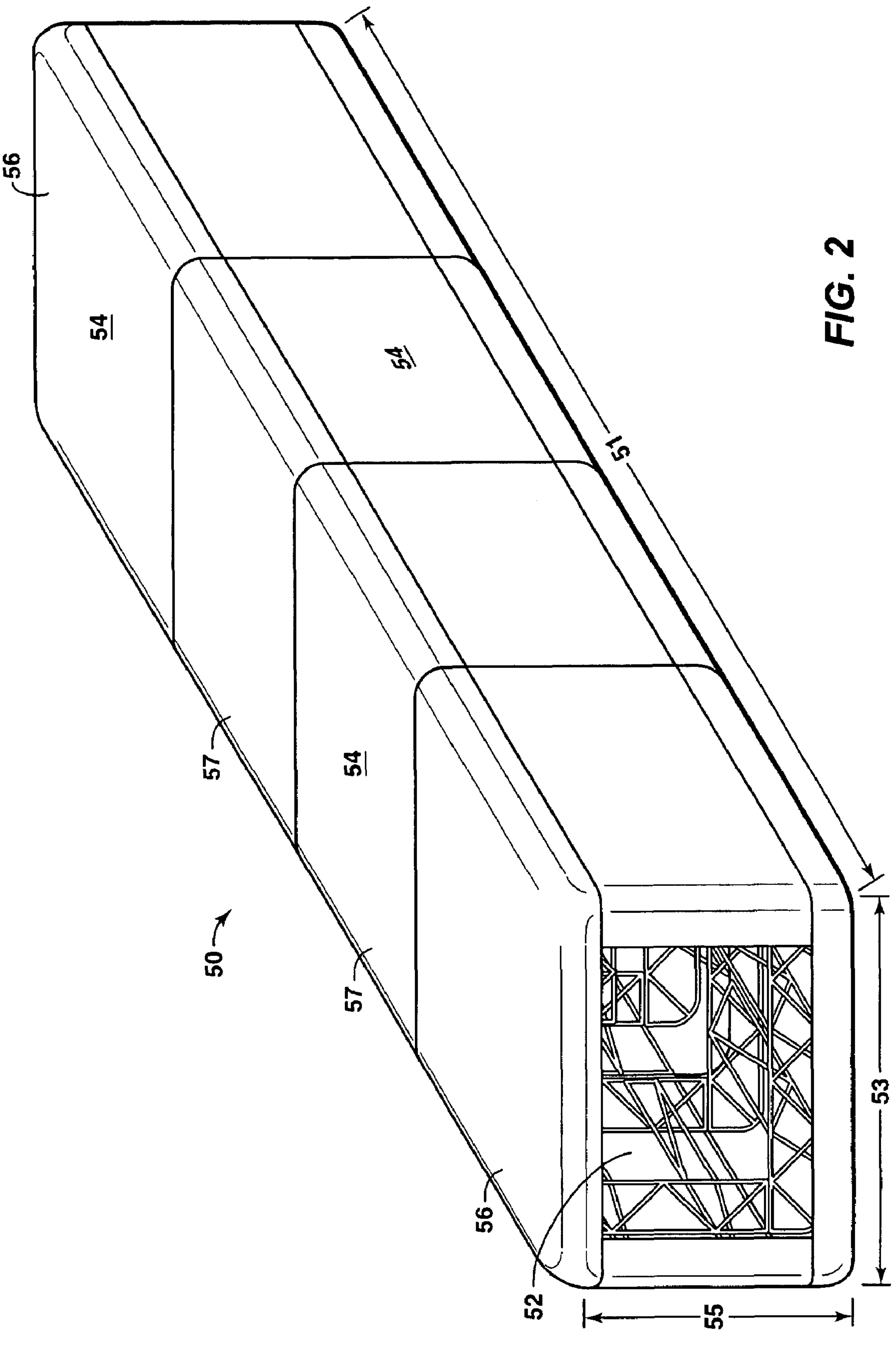
FIG. 2 is a sketch of another configuration of a tank according to this invention.
Figure 3:
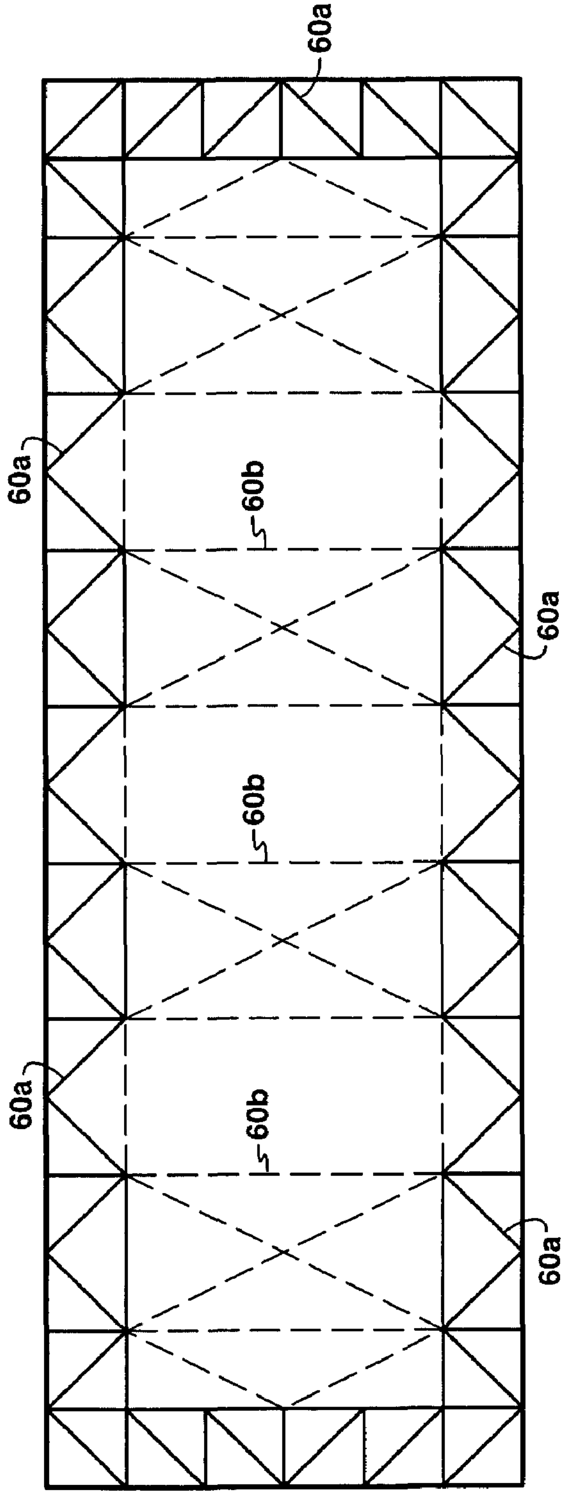
FIG. 3 illustrates truss members and their arrangement in the length direction of the tank shown in FIG. 2.
Figure 4:
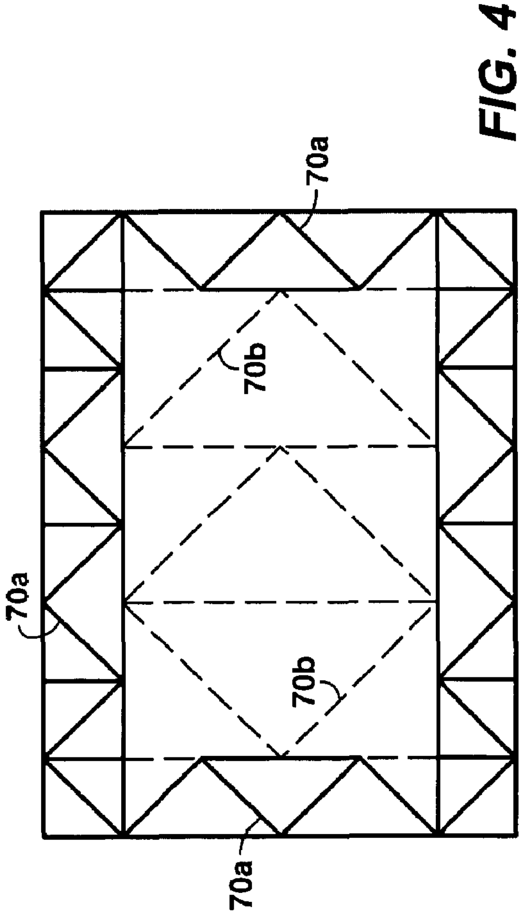
FIG. 4 illustrates truss members and their arrangement in the width direction of the tank shown in FIG. 2.

In another embodiment of this invention, a modified tank design configuration resulting in more fabrication friendly methods for constructing a tank of this invention is provided. FIG. 2 depicts the configuration of the structure of tank 50. An end panel is removed from tank 50 (i.e., not shown in FIG. 2) to reveal some of the internal structure 52 of tank 50. In somewhat greater detail, 100,000 meter$^3$ capacity rectangular tank 50 has a 90 meter (approximately 295 ft.) length 51, a 40 meter (approximately 131 ft.) width 53 and a 30 meter (approximately 99 ft.) height 55. When fully assembled and installed at the location of service, tank 50 comprises internal structure 52 comprised of a substantially rectangular-shaped internal truss frame structure, a grillage of stiffeners and stringers (not shown in FIG. 2) attached to the truss frame structure, and a thin plate cover 54 sealingly attached to the structural grillage of stringers and stiffeners; and fully-assembled tank 50 provides a contiguous and unencumbered space for liquefied gas storage in the interior. FIGS. 3 and 4 show sectional views of tank 50 (of FIG. 2) cut respectively by lengthwise (longitudinal) and widthwise (transverse) vertical planes. FIG. 3 shows typical truss frame structure members 60*a* and 60*b* and their arrangement in the length (longitudinal) direction of tank 50. FIG. 4 shows typical truss frame structure members 70*a* and 70*b* and their arrangement in the width (transverse) direction of tank 50.

For a fully assembled tank, the design illustrated by FIGS. 2–4 separates the required tank functions of fluid containment and the provision of tank strength and stability by providing separate and distinct structural systems for each, i.e., a thin plate cover for fluid containment and a three dimensional truss frame structure and a grillage of stiffeners and stringers for overall strength and stability, albeit an integrated fabrication of the two systems is proposed to achieve economy in installed tank cost. For fabrication purposes, therefore, tank 50 can be considered as divided into four sections, as shown in FIG. 2, comprising two substantially identical end sections 56 and two substantially identical mid sections 57. Each of the end and mid sections of the tank can be further subdivided into panels (see, e.g., panels 83, 84, and 85 of FIG. 5A). Each said panel may comprise the plate cover, stiffeners and/or stringers, and structural members or gridworks of structural members to be used in the construction of the internal truss structure. To facilitate fabrication, internal structure 52 is divided into two parts, a part that can be attached to the panels as they are being fabricated on the panel line of a shipyard and a part that is installed in the interior of tank 50 as the panels are being assembled into a completed tank. Solid lines in FIGS. 3 and 4 show truss members 60*a* and 70*a* that are attached to the panels as they are fabricated; while dotted lines illustrate truss members 60*b* and 70*b* that are installed as the panels are assembled into a completed tank structure.

Figure 5B:
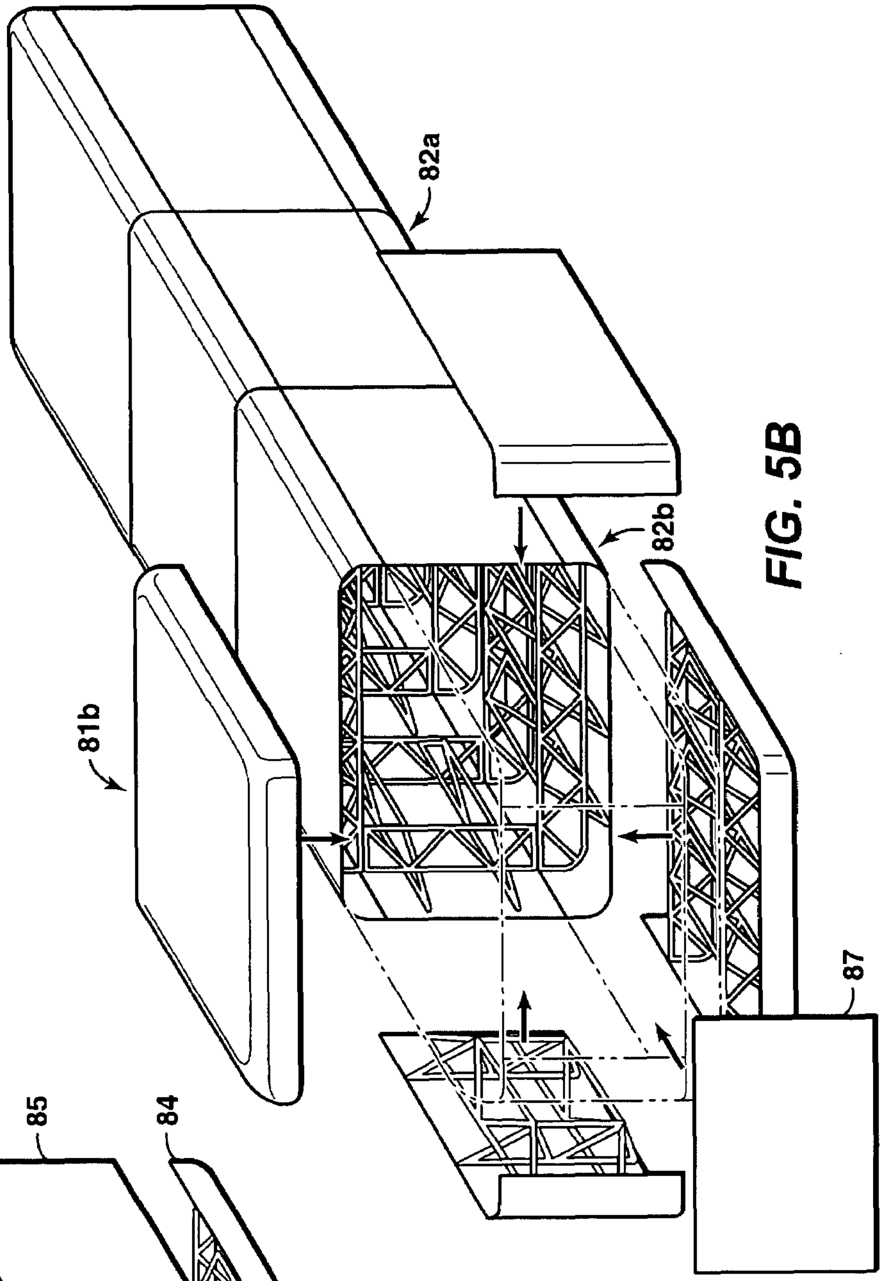
FIGS. 5A, 5B, and 5C illustrate one method of constructing a tank according to this invention from four sections, each section being comprised of at least four panels.
Figure 5A:
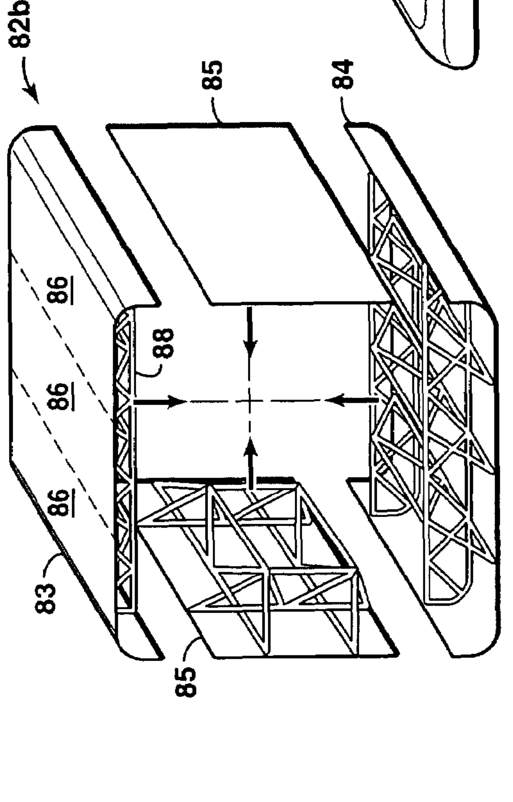
Figure 5C:
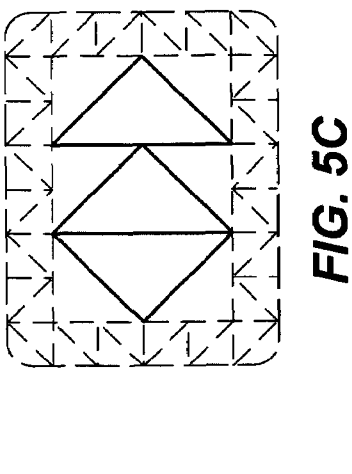

Referring to FIGS. 5A and 5B, for fabrication purposes, excluding some interior truss members that are to be installed later (shown in FIG. 5C), a tank according to this invention is initially constructed as four separate sections 81*a*, 82*a*, 82*b*, and 81*b* (section 81*b* being shown in an exploded view in FIG. 5B and section 82*b* being shown in an exploded view in FIG. 5A), with each of two mid sections 82*a* and 82*b* comprising four panels each, i.e., a top panel 83, a bottom panel 84 and two side panels 85, and each of two end sections 81*a* and 81*b* as comprising five panels each, a top panel, a bottom panel, two side panels, and another panel referred to as a third side panel or an end panel 87. In this illustration, the largest panel, e.g., panel 83 for a mid section 82*a* or 82*b* comprises one or more plates 86 joined together, stiffeners and/or stringers (not shown) and parts of internal truss frame structure members 88. The panels (eighteen in number in the present illustration) are fabricated first and assembled into a tank unit as discussed hereunder.

Figure 6B:
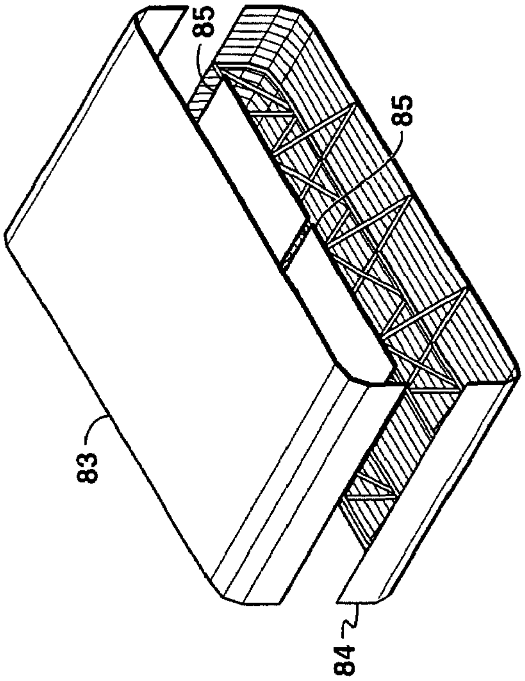
FIGS. 6A and 6B illustrate one method of stacking the panels of a section shown in FIG. 5A.
Figure 6A:
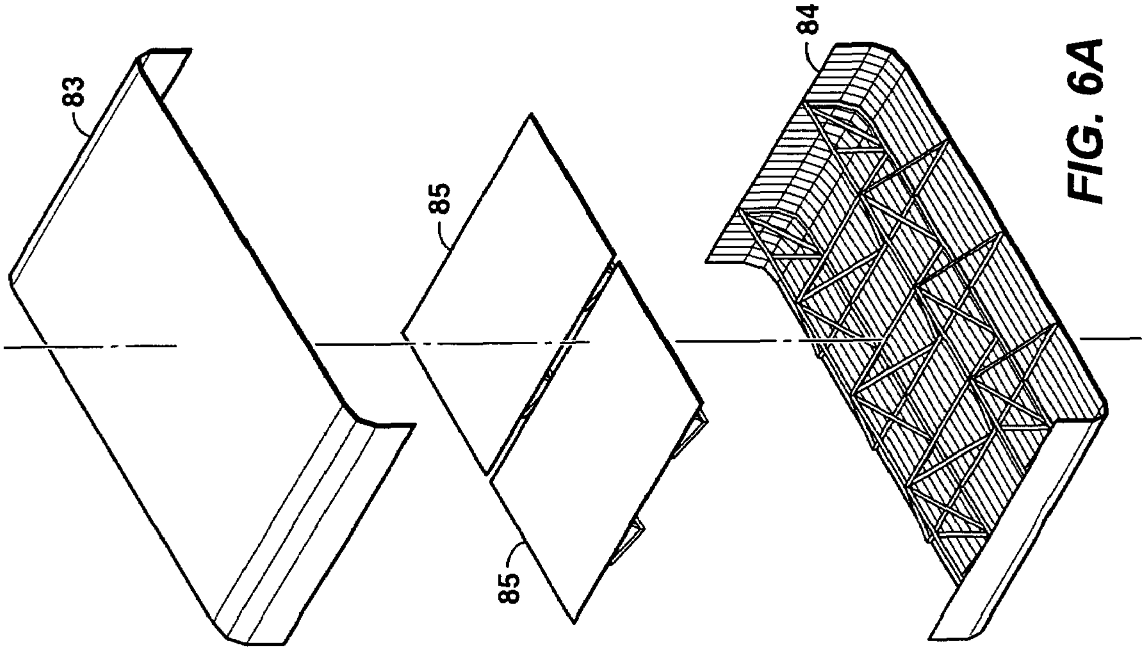
Figure 7:
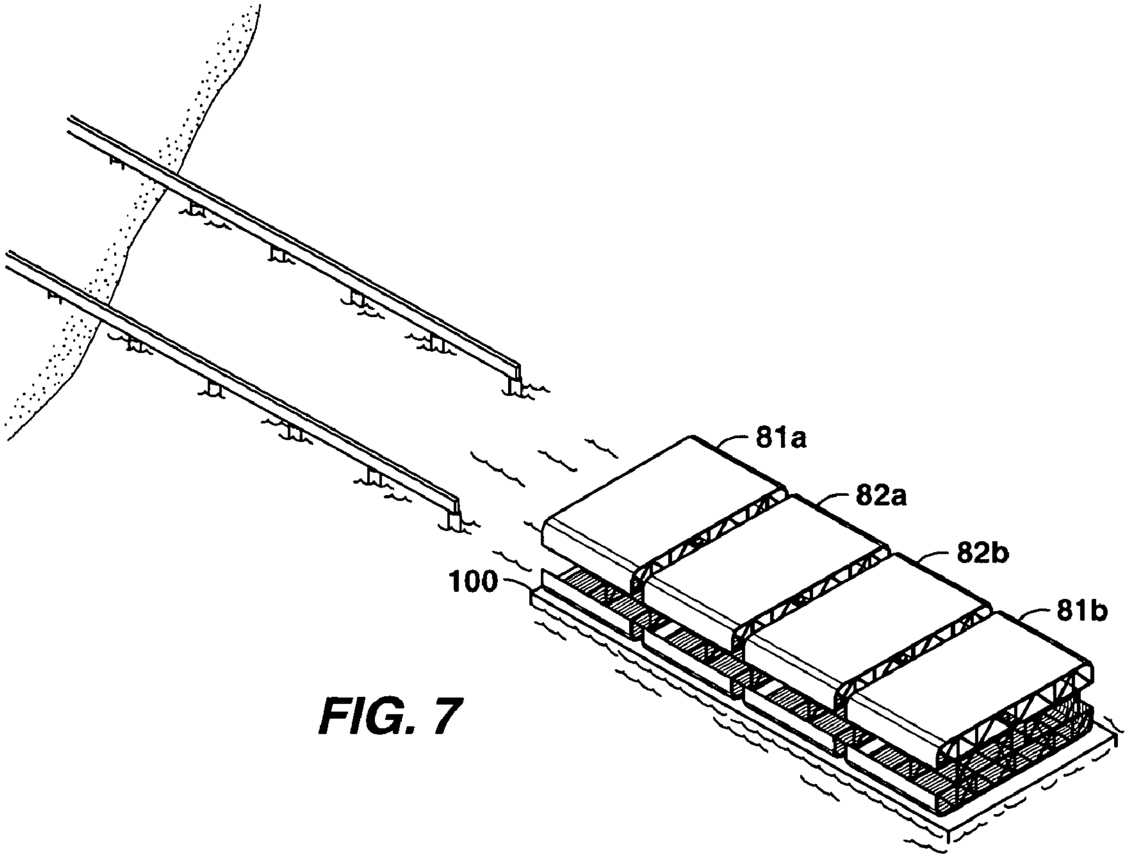
FIG. 7 illustrates one method of loading the panels of FIG. 5A, stacked as shown in FIGS. 6A and 6B, onto a barge.
Figure 8:
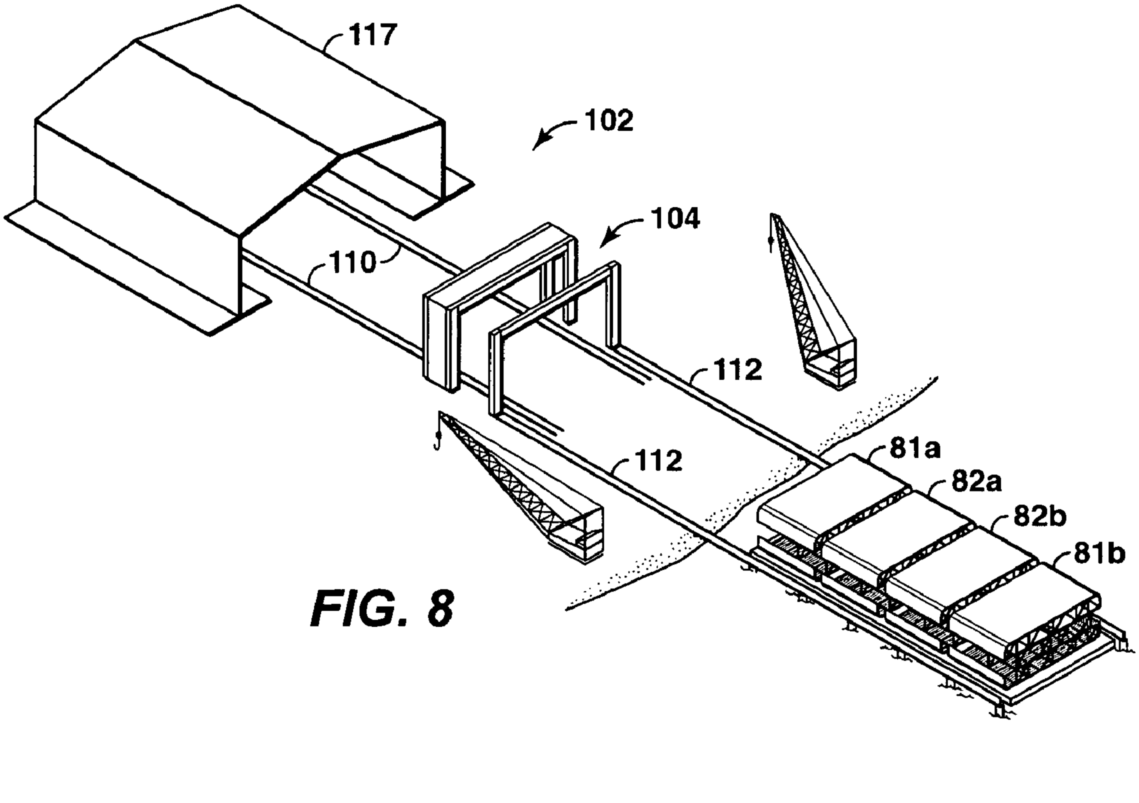
FIG. 8 illustrates one method of unloading the panels of FIG. 5A, stacked as shown in FIGS. 6A and 6B, off of a barge.
Figure 9B:
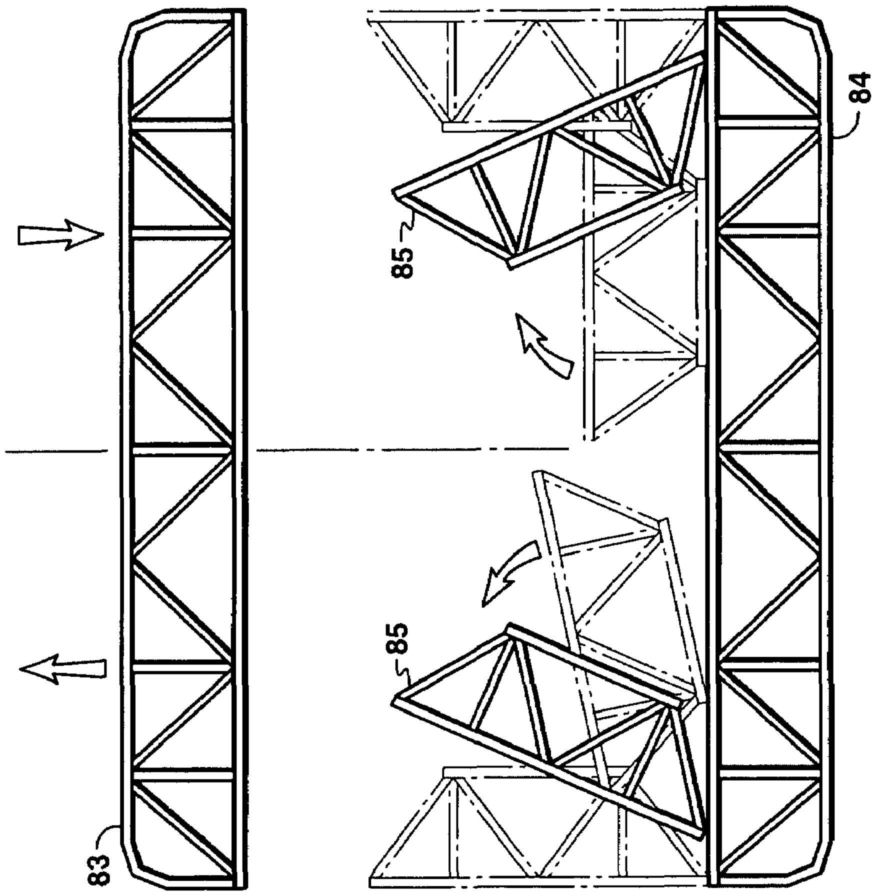
FIGS. 9A and 9B illustrate one method of unfolding and joining together the stacked parts of FIGS. 6A and 6B at a tank assembly site.
Figure 9A:
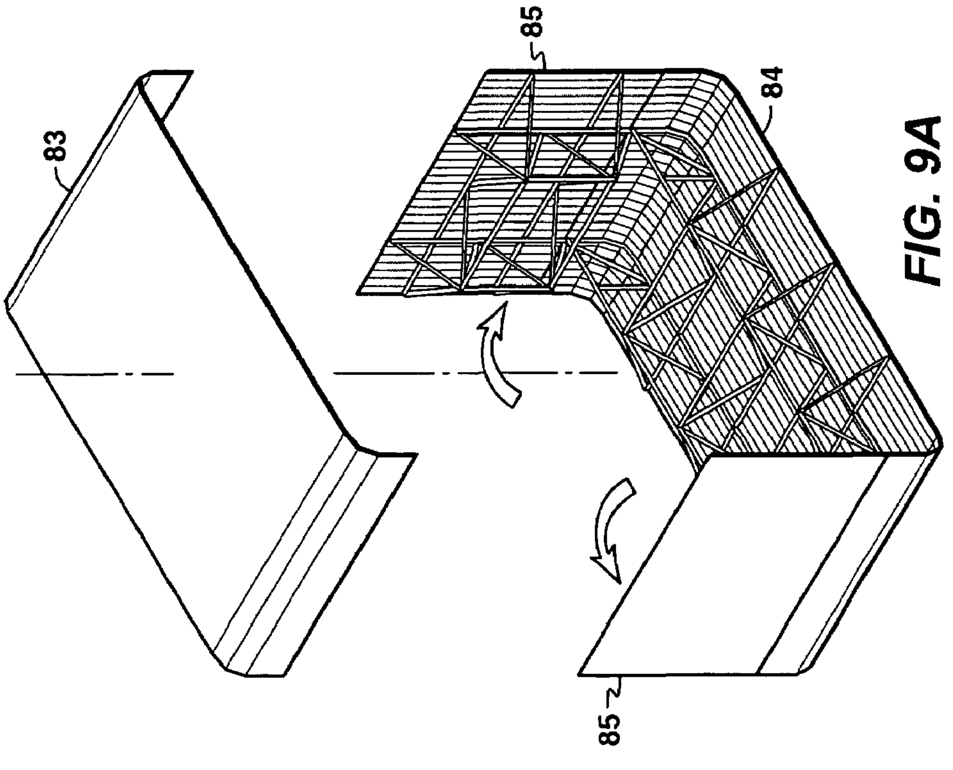
Figure 10B:
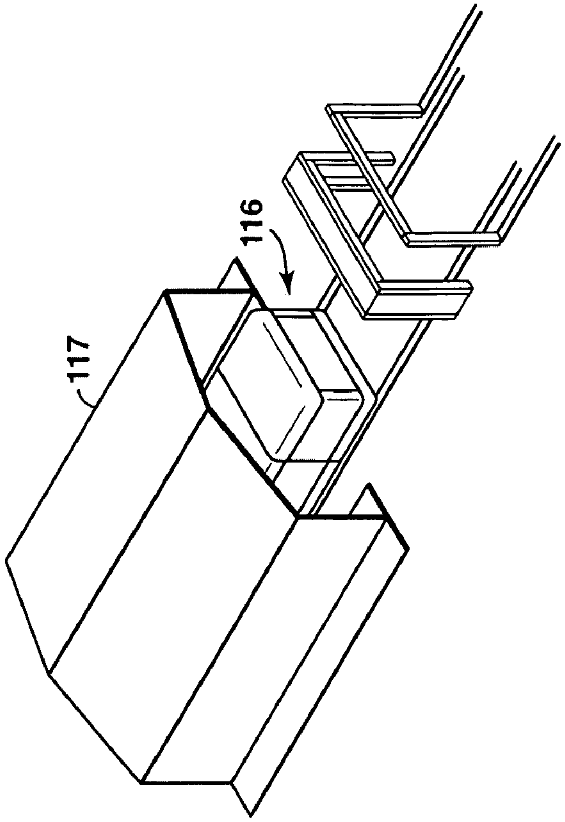
FIGS. 10A and 10B illustrate the assembly of the sections of FIG. 5B into a completed tank and the skidding of the completed tank into place inside a secondary container.
Figure 10A:
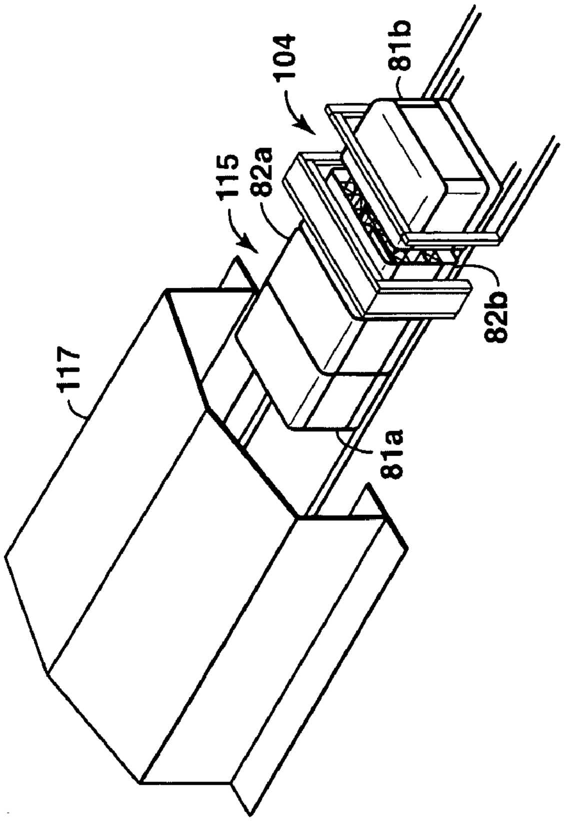

In one embodiment, the panel fabrication starts with delivery of plates to a shipyard where the plates are marked, cut and fabricated into plate cover, stiffener, stringer and truss frame structure member elements. The panel elements are joined together by any applicable joining technique known to those skilled in the art, e.g., by welding, and stiffeners, stringers, and truss frame structure elements are attached to the panel at the sub-assembly and assembly lines normally used on modern shipyards. Upon completion of the fabrication operation, panels for each tank section are stacked separately as indicated in FIGS. 6A and 6B. For example, using the same numbering as for mid section 82*b* of FIGS. 5A and 5B, top panel 83, side panels 85, and bottom panel 84 are stacked as shown. Referring now to FIG. 7, sets of the four stacked panels comprising the four sections 81*a*, 82*a*, 82*b*, and 81*b* of the illustrated tank in FIG. 5B, along with additional structural members of the truss frame structure (not shown in FIG. 7) that are going to be installed in the field as the panels are assembled to construct the tank structure, are loaded on a sea-going barge 100 and transported to the site for tank construction. End panels are not shown in FIGS. 7 and 8, but are also loaded on sea-going barge 100. Referring now to FIG. 8, at the site 102 for tank construction, the sets of the four stacked panels comprising the four sections 81*a*, 82*a*, 82*b*, and 81*b* and the additional truss structural members (not shown in FIG. 8) are off-loaded and moved to the tank assembly site 104 near skidder tracks 110, rail tracks 112, and secondary container 117. At the tank assembly site 104, the panels for each tank section are unfolded and joined together to create each section of the tank. For example, the unfolding and joining of panels 83, 84, 85 to make section 82*b* (as shown in FIGS. 5A and 5B) is illustrated in FIGS. 9A and 9B. With panel 83 being lifted, sides 85 are folded outwardly until substantially vertical, and then panel 83 is set down and joined to the sides 85. At this stage, partial additional truss frame structure members are installed in the tank interior in both the tank length and width directions (an example of this framing is shown by dotted lines in FIGS. 3 and 4). In one embodiment, the four sections 81*a*, 82*a*, 82*b*, and 81*b* are then assembled at tank assembly site 104 and joined together, e.g., by welding, to form a partially completed tank 115 as shown in FIG. 10A and a completed tank 116 as shown in FIG. 10B. In the embodiment illustrated in FIG. 10B, completed tank 116 is tested for liquid and gas tightness and skidded into place inside secondary container 117.

Referring again to FIGS. 1B and 1C, due to the openness of internal, truss frame structure 18, the interior of a tank according to this invention, such as tank 10 of FIG. 1, is effectively contiguous throughout so that LNG or other fluid stored therein is free to flow from end to end without any effective encumbrances in between. This inherently provides a tank having more efficient storage space than is present in the same-sized tank having bulkheads. Another advantage of a tank according to this invention is that only a single set of tank penetrations and pumps are required to fill and empty the tank. More importantly, due to the relatively long, open spans of tank 10 of the present invention, any sloshing of the stored liquid caused by seismic activity induces relatively small dynamic loading on tank 10. This loading is significantly smaller than it would otherwise be if the tank had multiple cells created by the bulkheads of the prior art.

Although this invention is well suited for storing LNG, it is not limited thereto; rather, this invention is suitable for storing any cryogenic temperature liquid or other liquid. Additionally, while the present invention has been described in terms of one or more preferred embodiments, it is to be understood that other modifications may be made without departing from the scope of the invention, which is set forth in the claims below. All tank dimensions given in the examples are provided for illustration purposes only. Various combinations of width, height and length can be devised to build tanks in accordance with the teachings of this invention.

GLOSSARY OF TERMS cryogenic temperature: any temperature of about −40° C. (40° F.) and lower;

GBS: Gravity Base Structure;

Gravity Base Structure: a substantially rectangular-shaped, barge-like structure;

grillage: network or frame;

LNG: liquefied natural gas at cryogenic temperatures of about −162° C. (−260° F.) and at substantially atmospheric pressure; and plate or plate cover: (i) one substantially smooth and substantially flat body of substantially uniform thickness or (ii) two or more substantially smooth and substantially flat bodies joined together by any suitable joining method, such as by welding, each said substantially smooth and substantially flat body being of substantially uniform thickness.

I claim:

1. A method of constructing a fluid storage tank having a substantially rectangular-shaped, internal truss frame structure, said method comprising:

(A) providing a plurality of plates, a plurality of stiffeners and stringers, a plurality of first truss frame elements, and a plurality of second truss frame elements;

(B) forming plate covers from one or more of said plurality of plates;

(C) joining a portion of said plurality of stiffeners and stringers to a first side of said plate covers;

(D) joining a portion of said plurality of first truss frame elements to said first side of a plate cover, thereby forming a panel element comprising a side wall portion of an internal truss frame structure;

(E) joining a portion of said plurality of second truss frame elements to said first side of a plate cover, thereby forming a panel element comprising an end wall portion of said internal truss frame structure;

(F) repeating steps (B) through (E) to form a plurality of panel elements;

(G) forming a plurality of tank modules from said plurality of panel elements;

(H) assembling said plurality of tank modules along with a tank top and a tank bottom to form a fluid storage tank with two tank side walls, two tank end walls, and a substantially rectangular-shaped truss frame structure comprising:

(i) a first plurality of truss structures extending transversely and longitudinally-spaced from each other along the length direction of said internal truss frame structure such that said first plurality of truss structures are (a) spaced from said two tank end walls and (b) in contact with said tank top, said tank bottom, and said two tank side walls; and (ii) a second plurality of truss structures extending longitudinally and transversely-spaced from each other along the width direction of said internal truss frame structure such that said second plurality of truss structures are (a) spaced from said two tank side walls and (b) in contact with said two tank end walls, said tank top, and said tank bottom;

wherein said first plurality of truss structures and said second plurality of truss structures are interconnected at their points of intersection and each of said first and second plurality of truss structures comprises:

(1) a plurality of both vertical, elongated supports and horizontal, elongated supports, connected to form a gridwork of structural members with a closed outer periphery, and (2) a plurality of additional support members secured within and between said connected vertical and horizontal, elongated supports to thereby form each said truss structure.

2. The method of claim 1, wherein said plurality of stiffeners and stringers are arranged in a substantially orthogonal pattern, interconnected and attached to the peripheral external extremities of said substantially rectangular-shaped, internal truss frame structure, said stiffeners and stringers are in substantially the vertical and horizontal directions respectively, or in substantially the horizontal and vertical directions respectively, wherein said tank is capable of storing fluids at substantially atmospheric pressure and said plate cover is adapted to contain said fluids and to transfer local loads caused by contact of said plate cover with said contained fluids to said plurality of stiffeners and stringers, which in turn is adapted to transfer said local loads to said substantially rectangular-shaped, internal truss frame structure.

3. The method of claim 1, further comprising transporting said plurality of tank modules from a first location to a second location and then assembling said plurality of tank modules to form a fluid storage tank.

4. A method as claimed in claim 1, further comprising forming a plurality of top panels, a plurality of side panels, and a plurality of bottom panels.

5. A method as claimed in claim 4 wherein said forming step (G) includes forming tank mid section modules and tank end section modules.

6. A method as claimed in claim 5 wherein said forming step (G) includes joining one said bottom panel to first ends of two said side panels, joining one said top panel to second ends of said two side panels, thereby forming a tank mid-section module comprising a portion of said internal truss frame.

* * * * *